United States Patent
Matsunami

(10) Patent No.: US 10,460,207 B2
(45) Date of Patent: Oct. 29, 2019

(54) IMAGE PROCESSING DEVICE, IMAGE PROCESSING METHOD AND COMPUTER-READABLE NON-TRANSITORY MEDIUM

(71) Applicant: FUJITSU LIMITED, Kawasaki-shi, Kanagawa (JP)

(72) Inventor: Tomoaki Matsunami, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 172 days.

(21) Appl. No.: 15/823,722

(22) Filed: Nov. 28, 2017

(65) Prior Publication Data
US 2018/0165545 A1 Jun. 14, 2018

(30) Foreign Application Priority Data
Dec. 14, 2016 (JP) ................. 2016-241948

(51) Int. Cl.
G06K 9/00 (2006.01)
G06K 9/62 (2006.01)

(52) U.S. Cl.
CPC ....... *G06K 9/6255* (2013.01); *G06K 9/00067* (2013.01); *G06K 9/00093* (2013.01); *G06K 9/00926* (2013.01)

(58) Field of Classification Search
None
See application file for complete search history.

(56) References Cited

U.S. PATENT DOCUMENTS

| | | | |
|---|---|---|---|
| 6,961,452 B2 | 11/2005 | Fujii | |
| 7,151,846 B1* | 12/2006 | Fujii | G06K 9/00067 382/125 |
| 9,935,948 B2* | 4/2018 | Schultz | H04L 63/0861 |
| 2001/0031075 A1 | 10/2001 | Fujii | |
| 2005/0058325 A1 | 3/2005 | Udupa et al. | |

(Continued)

FOREIGN PATENT DOCUMENTS

| | | |
|---|---|---|
| JP | 2001-243465 A | 9/2001 |
| JP | 2001-344604 | 12/2001 |

(Continued)

OTHER PUBLICATIONS

Extended European Search Report dated May 7, 2018 for corresponding European Patent Application No. 17204021.4, 10 pages.

(Continued)

*Primary Examiner* — Vikkram Bali
(74) *Attorney, Agent, or Firm* — Fujitsu Patent Center

(57) ABSTRACT

An image processing device includes: a memory; and a processor coupled to the memory and the processor configured to execute a process, the process comprising: acquiring a plurality of biometric images of a same biological body part of a same user from a biometric sensor; generating, when a feature point appears at a corresponding position of the same biological body part in one or more of the plurality of biometric images and a feature point does not appear at the corresponding position in another of the plurality of biometric images, a pseudo feature point at the corresponding position of the another; and storing information of the feature point and the pseudo feature point of the plurality of biometric images as a biometric feature.

20 Claims, 12 Drawing Sheets

(56) References Cited

U.S. PATENT DOCUMENTS

2008/0101662 A1\* 5/2008 Lo ................. G06K 9/0008
                                                          382/124
2010/0060417 A1 3/2010 Ninuma
2015/0139492 A1 5/2015 Irie

FOREIGN PATENT DOCUMENTS

| JP | 2002-373334 | 12/2002 |
|---|---|---|
| JP | 2006-012080 | 1/2006 |
| JP | 2010-061528 | 3/2010 |
| JP | 2010-086546 | 4/2010 |
| JP | 2015-097000 | 5/2015 |

OTHER PUBLICATIONS

Nguyen, Thi Huong Thuy et al., "An Efficient Method for Fingerprint Matching Based on Local Point Model", Computing, Management and Telecommunications (Commantel), 2013 International Conference on, IEEE, Jan. 21, 2013, pp. 334-339, XP032345878.

Nguyen, Thi Huong Thuy et al., "An Efficient Cascaded System for Latent Fingerprint Recognition", 2013 IEEE RIVF International Conference on Computing & Communication Technologies—Research, Innovation, and Vision for Future (RIVF), IEEE, Nov. 10, 2013, pp. 123-126, XP032555091.

Zhang, Tanghui et al., "Fingerprint Alignment Using Similarity Histogram", Audio- and Video-Based Biometric Person Authentication, 4th International Conference, AVBPA 2003. Proceedings (Lecture Notes in Computer Science vol. 2688) Springer-Verlag Berlin, Germany, 2003, pp. 854-861, XP002780539.

Chouta, Taoufik et al., "A Small and High-Performance Coprocessor for Fingerprint Match-on-Bard", 2012 15th Euromicro Conference on Digital System Design, IEEE, Sep. 5, 2012, pp. 915-922, XP032293826.

Maltoni, Davide et al., "Handbook of Fingerprint Recognition, Chapter 4, Fingerprint Matching", Handbook of Fingerprint Recognition; [Springer Professional Computing], Springer Verlag, New York, US, Jan. 1, 2003, pp. 131-171, XP002475578.

Lin, Kunming et al., "Feature Level Fusion of Fingerprint and Finger Vein Biometrics", ECCV 2016 Conference; [Lecture Notes in Computer Science; Lect. Notes Computer], Springer International Publishing, Cham, Jun. 12, 2011, pp. 348-355, XP047435922.

European Office Action dated Feb. 22, 2019 for corresponding European Patent Application No. 17204021.4, 7 pages.

European Office Action dated dated Aug. 13, 2019 for corresponding European Patent Application No. 17204021.4, 6 pages.

\* cited by examiner

FIG. 7

| No. | COORDINATE OF BIOMETRIC STANDARD POINT | STANDARD POINT OF FIRST BIOMETRIC IMAGE | STANDARD POINT OF SECOND BIOMETRIC IMAGE |
|---|---|---|---|
| 1 | $(x_1, y_1)$ | $P_1$ | $Q_1$ |
| 2 | $(x_2, y_2)$ | $P_2$ | $q_5$ |
| 3 | $(x_3, y_3)$ | $P_3$ | $Q_2$ |
| 4 | $(x_4, y_4)$ | $P_4$ | $Q_4$ |
| 5 | $(x_5, y_5)$ | $p_5$ | $Q_3$ |

FIG. 8

| No. | COORDINATE OF BIOMETRIC STANDARD POINT | BIOMETRIC FEATURE OF FIRST BIOMETRIC IMAGE | BIOMETRIC FEATURE OF SECOND BIOMETRIC IMAGE |
|---|---|---|---|
| 1 | $(x_1, y_1)$ | $F_{P1}$ | – |
| 2 | $(x_2, y_2)$ | $F_{P2}$ | $F_{q5}$ |
| 3 | $(x_3, y_3)$ | $F_{P3}$ | $F_{Q2}$ |
| 4 | $(x_4, y_4)$ | $F_{P4}$ | – |
| 5 | $(x_5, y_5)$ | $F_{p5}$ | $F_{Q3}$ |

FIG. 10

ENROLLED BIOMETRIC INFORMATION

| No. | COORDINATE OF BIOMETRIC STANDARD POINT | BIOMETRIC FEATURE | |
|---|---|---|---|
| 1 | $(x_1, y_1)$ | $F_{P1}$ | — |
| 2 | $(x_2, y_2)$ | $F_{P2}$ | $F_{q5}$ |
| 3 | $(x_3, y_3)$ | $F_{P3}$ | $F_{Q2}$ |
| 4 | $(x_4, y_4)$ | $F_{P4}$ | — |
| 5 | $(x_5, y_5)$ | $F_{p5}$ | $F_{Q3}$ |

BIOMETRIC IMAGE FOR COMPARISON

| No. | COORDINATE OF BIOMETRIC STANDARD POINT | BIOMETRIC FEATURE |
|---|---|---|
| 1 | $(x_1', y_1')$ | $I_1$ |
| 2 | $(x_2', y_2')$ | $I_2$ |
| 3 | $(x_3', y_3')$ | — |
| 4 | $(x_4', y_4')$ | $I_3$ |
| 5 | $(x_5', y_5')$ | $I_4$ |

IMAGE PROCESSING DEVICE, IMAGE PROCESSING METHOD AND COMPUTER-READABLE NON-TRANSITORY MEDIUM

CROSS-REFERENCE TO RELATED APPLICATION

This application is based upon and claims the benefit of priority of the prior Japanese Patent Application No. 2016-241948, filed on Dec. 14, 2016, the entire contents of which are incorporated herein by reference.

FIELD

A certain aspect of embodiments described herein relates to an image processing device, an image processing method and a computer-readable non-transitory medium.

BACKGROUND

A biometric authentication system extracts a biometric feature from a biological body input from a user and performs an identity verification by comparing the biometric feature with an enrolled biometric feature. For example, in an authentication using a fingerprint, a palm print, a vein or the like, a biometric image is generated from information obtained from a biological body part of the user by a sensor. And a biometric feature for identifying an individual such as a feature point such as an edge point or a branched point or a direction of a linear-shaped pattern is extracted. And the extracted feature is used for the authentication.

However, biometric features extracted from a user fluctuate in accordance with an inputting method or an environment. A feature point appearing in one of biometric images may not appear in the other. That is, there may be variability in the extracted biometric feature. The variability may cause increasing of an error in the identity verification. And so, there are disclosed technologies that influence of the variability is suppressed (for example, see Japanese Patent Application Publications No. 2001-344604 and No. 2010-61528).

SUMMARY

However, with the technologies, it is difficult to achieve a stable authentication when biometric information with variability is input.

According to an aspect of the present invention, there is provided an image processing device including: a memory; and a processor coupled to the memory and the processor configured to execute a process, the process including: acquiring a plurality of biometric images of a same biological body part of a same user from a biometric sensor; generating, when a feature point appears at a corresponding position of the same biological body part in one or more of the plurality of biometric images and a feature point does not appear at the corresponding position in another of the plurality of biometric images, a pseudo feature point at the corresponding position of the another; and storing information of the feature point and the pseudo feature point of the plurality of biometric images as a biometric feature.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 7 illustrates an association of biometric standard point pair;

FIG. 8 illustrates enrolled biometric information;

FIG. 10 illustrates an association of biometric standard point pair;

DESCRIPTION OF EMBODIMENTS

The following is a description of embodiments of the present invention, with reference to the accompanying drawings.

First Embodiment

A description will be given of terms used in the following embodiments. An instance is a unit of a biological body part used for an authentication. For example, the instance is a finger, a palm, a face, an eye or the like. Therefore, the finger and the eye are different instances. A middle finger and a ring finger are different instances. A right eye and a left eye are different instances. A modality is a type of a biometric feature. For example, the modality is a fingerprint, a vein, a palm print, an iris, a face shape, a pal shape or the like. Therefore, a fingerprint and a vein of an identical finger are different modalities.

Figure 1:
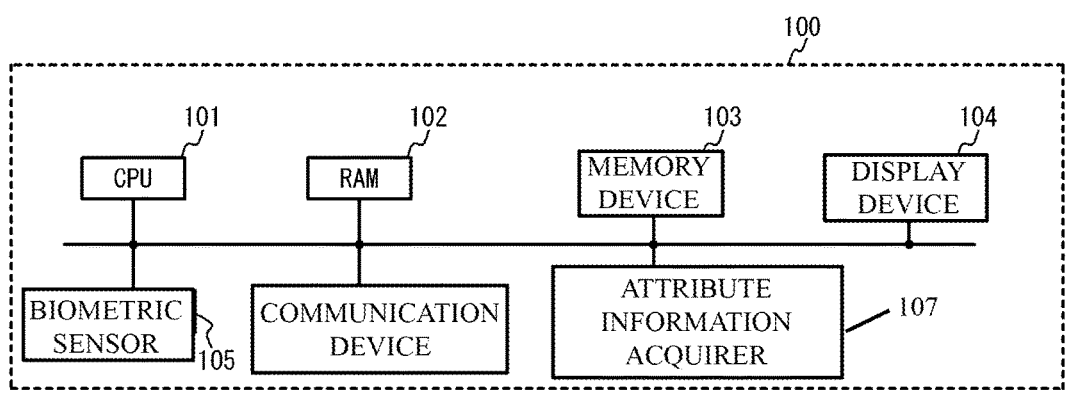
FIG. 1 illustrates a hardware structure of the image processing device in accordance with a first embodiment.

FIG. 1 illustrates a hardware structure of an image processing device 100. As illustrated in FIG. 1, the image processing device 100 has a CPU (Central Processing unit) 101, a RAM (Random Access Memory) 102, a memory device 103, a display device 104, a biometric sensor 105, a communication device 106, an attribute information acquirer 107 and so on. These components are coupled to each other with a bus or the like.

The CPU 101 is a central processing unit. The CPU 101 includes one or more core. The RAM 102 is a volatile memory temporally storing a program executed by the CPU 101, a data processed by the CPU 101, and so on.

The memory device 103 is a nonvolatile memory device. The memory device 103 may be a SSD (Solid State Drive) such as a ROM (Read Only Memory) or a flash memory, or a hard disk driven by a hard disk drive. The memory device 103 stores an image processing program in accordance with the first embodiment. The display device 104 is such as a liquid crystal device and shows results of processes described later.

The biometric sensor 105 is a sensor for acquiring biometric information of a user. The biometric sensor 105 acquires a biometric image from a predetermined instance of a user. The biometric sensor 105 may acquire a biometric image of a part of an instance. The biometric sensor 105 acquires an image (hereinafter referred to as a biometric image) of a modality including a linear-shaped pattern such as a fingerprint, a vein, a palm print or the like. When an image of a fingerprint is acquired, the biometric sensor 105 is an optical sensor, an electrostatic capacity sensor or the like. When a vein or a palm print is acquired, the biometric sensor 105 is a CMOS (Complementary Metal Oxide Semiconductor) camera or the like.

The communication device 106 is a connection interface to LAN (Local Area Network) or the like. The attribute information acquirer 107 is a mouse, a keyboard or the like. For example, the attribute information acquirer 107 is a device for inputting an ID for identifying a user, a user name, a password or the like.

An image processing program stored in the memory device 103 is developed to the RAM 102. The CPU 101 executes the image processing program developed to the RAM 102. Thus, each process is executed by the image processing device 100. By the execution of the image processing program, an enrollment process, an authentication process and so on are performed.

In the enrollment process, a biometric feature extracted from a biometric image acquired by the biometric sensor 105 is associated with each user and is enrolled as an enrolled biometric feature. In the embodiment, a fingerprint, a vein, a palm print or the like extracted from a biometric image is enrolled as a biometric feature. In the authentication process, a biometric feature for comparison acquired by the biometric sensor 105 is compared with an enrolled biometric feature. In the embodiment, when a similarity between a fingerprint pattern acquired in the authentication process and an enrolled fingerprint pattern is equal to or more than a threshold, it is determined that a user is the same as an enrolled user. Details of each process will be described later.

Figure 2:
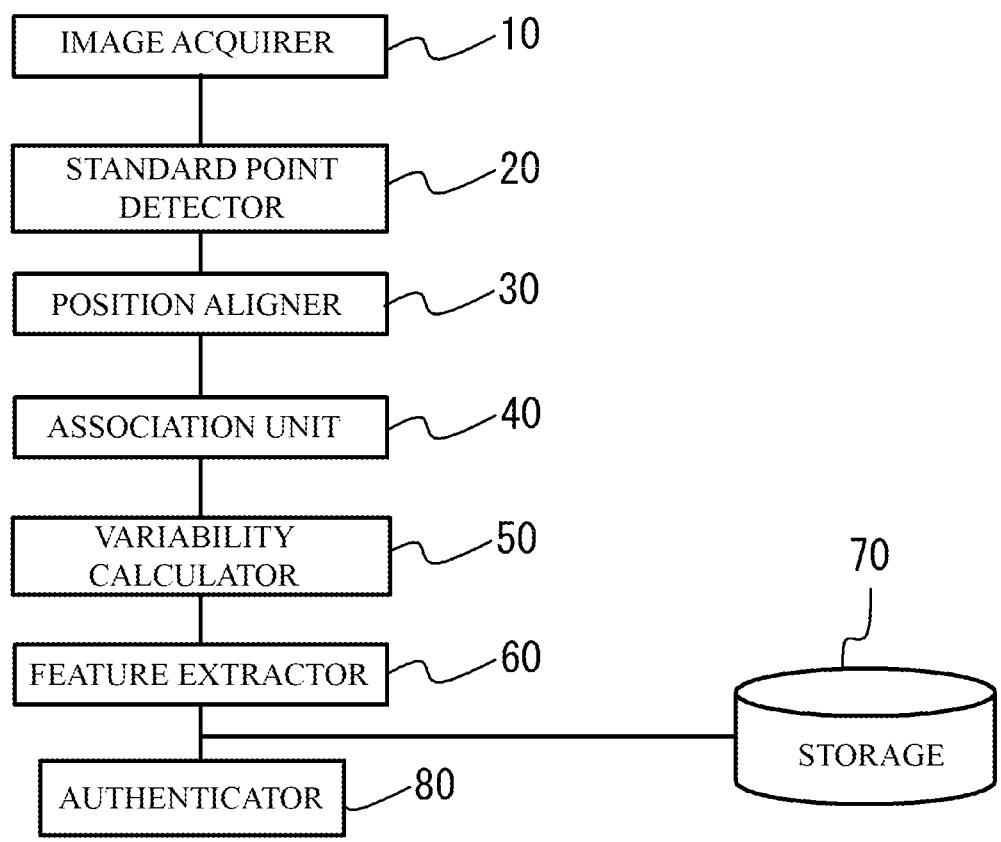
FIG. 2 illustrates a block diagram of functions established by execution of the image processing program.

FIG. 2 illustrates a block diagram of functions established by execution of the image processing program. By the execution of the image processing program, an image acquirer 10, a standard point detector 20, a position aligner 30, an association unit 40, a variability calculator 50, a feature extractor 60, a storage 70, an authenticator 80 and so on are established. FIG. 1 and FIG. 2 illustrate a stand-alone terminal. However, the structure is not limited. For example, the embodiment can be applied to a system of a client server. In the embodiment, for simplicity, a description will be given of a stand-alone terminal.

[Enrollment Process]

Figure 3:
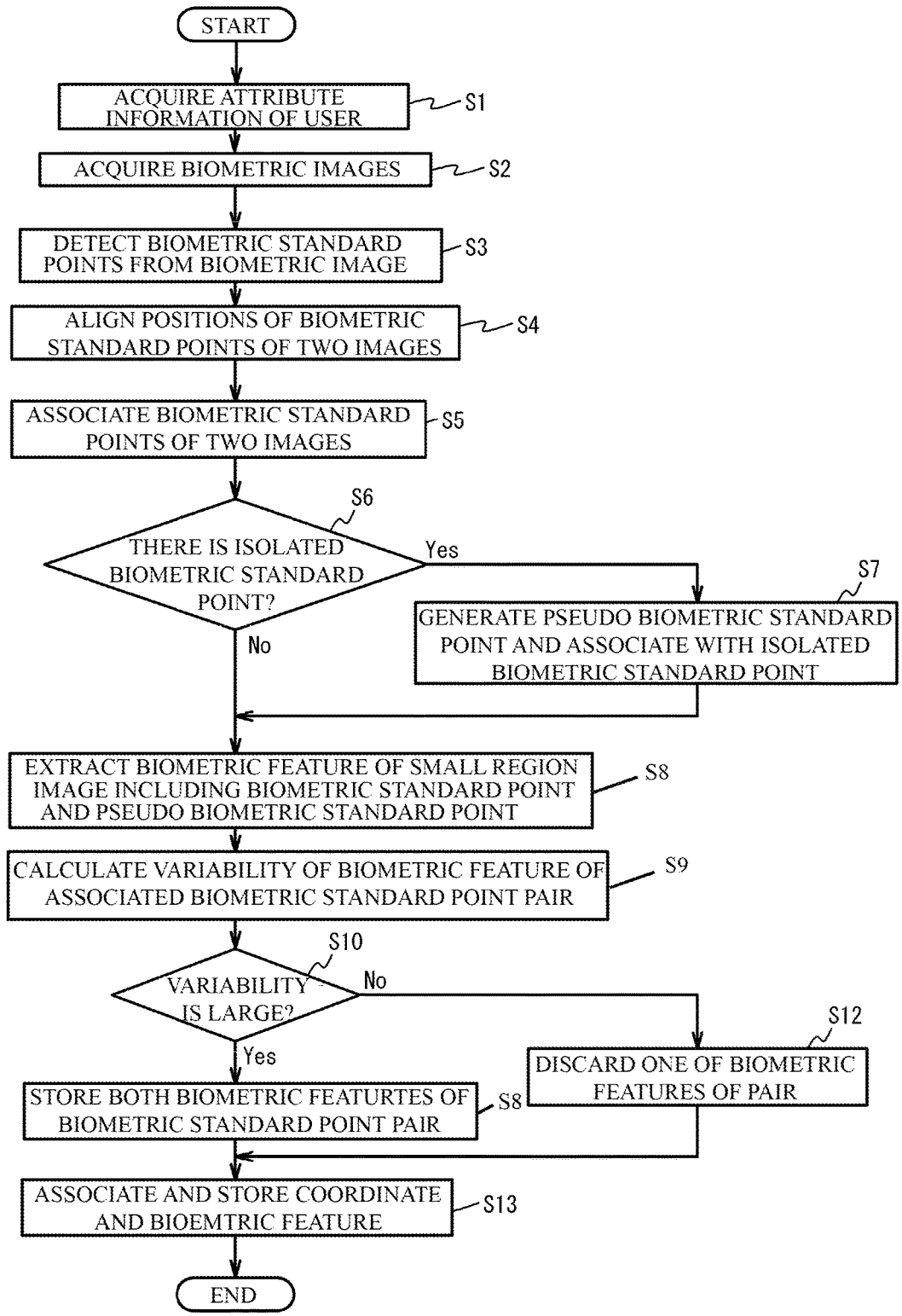
FIG. 3 illustrates a flowchart of details of an enrollment process.

FIG. 3 illustrates a flowchart of details of the enrollment process. A description will be given of the enrollment process on the basis of FIG. 2 and FIG. 3. As an example, the embodiment focuses on a finger as an instance, and focuses on a fingerprint as a modality. The attribute information acquirer 107 acquires attribute information of a user (Step S1). Next, the image acquirer 10 acquires a plurality of biometric images of the same biological body part of the user from the biometric sensor 105 (Step S2). The same biological body part means the same instance or the same partial region of the same instance. For example, the biometric sensor 105 captures a biometric image of a fingerprint of a predetermined finger of the user when the user places his or her finger on a sensing face of the biometric sensor 105 or slides the finger on the sensing face. During the enrollment process, when the user repeats inputting twice or more, the plurality of biometric images can be captured. In the embodiment, the image acquirer 10 acquires two biometric images (a first biometric image and a second biometric image).

Figure 4A:
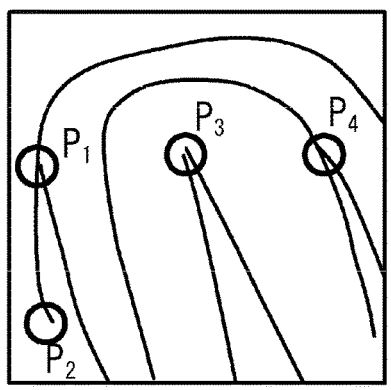
FIG. 4A illustrates biometric standard points detected from a first biometric image.
Figure 4B:
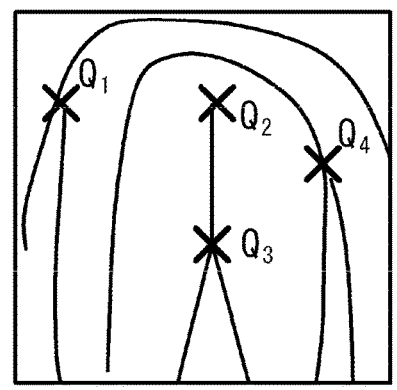
FIG. 4B illustrates biometric standard points detected from a second biometric image.

Next, the standard point detector 20 detects biometric standard points from each of the biometric images (Step S3). The biometric standard point means a feature point of a linear-shaped pattern expressing a biometric feature. When the biometric images include a fingerprint, the biometric standard point means an edge point or a branched point of a fingerprint edge line that is called a fingerprint minutia. The position of the biometric standard point can be expressed by a two-dimensional coordinate of which an origin is a center of the image. FIG. 4A illustrates biometric standard points $P_1$ to $P_4$ detected from the first biometric image. FIG. 4B illustrates biometric standard points $Q_1$ to $Q_4$ detected from the second biometric image.

Next, the position aligner 30 aligns positions of the biometric standard points of the first biometric image and positions of the biometric standard points of the second biometric image (Step S4). A position gap occurs between the biometric standard points of the first biometric image and the biometric standard points of the second biometric image, because the position of the finger of the user fluctuates on the sensing face or the movement of the sliding of the finger fluctuates on the sensing face. And so, the position aligner 30 cancels the position gap by converting the coordinate of one of the first biometric image and the second biometric image. For example, the position aligner 30 cancels the position gap between the first biometric image and the second biometric image by converting the coordinate of the first biometric image. The converting of the coordinate includes at least one of a parallel movement and a rotation movement. For example, the converting of the coordinate is an affine conversion. The affine conversion converts an image I(x, y) into an image I'(x', y') as expressed by the following formula (1).

$$\begin{pmatrix} x' \\ y' \\ 1 \end{pmatrix} = \begin{pmatrix} S_x\cos\theta & -\sin\theta & T_x \\ \sin\theta & S_y\cos\theta & T_y \\ 0 & 0 & 1 \end{pmatrix} \begin{pmatrix} x \\ y \\ 1 \end{pmatrix} \qquad \text{[Formula 1]}$$

Figure 5:
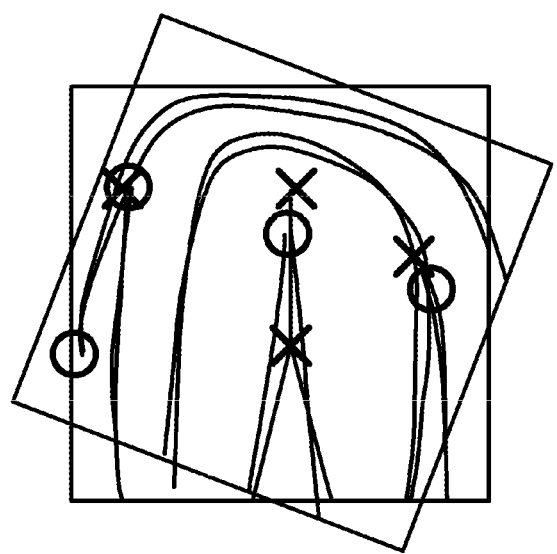
FIG. 5 illustrates a result of overlapping.

In the formula (1), $T_x$ means an amount of a parallel movement in an x-direction, and $T_y$ means an amount of a parallel movement in a y-direction. $S_x$ means a shrinkage degree in the x-direction, and $S_y$ means a shrinkage degree in the y-direction. $\theta$ means an amount of the rotation movement. These parameters are determined as follows. Two biometric standard points are selected from the first biometric image, and two biometric standard points are selected from the second biometric image. Parameters of the affine conversion are calculated so that a line segment connecting the two biometric standard points of the first biometric image coincides with a line segment connecting the two biometric standard points of the second biometric image. And the calculated parameters are applied to the first biometric image. In this case, the number of the parameters is the number of pairs for selecting two points from the total number of the biometric standard points. Parameters are adopted so that a total sum of distances between the biometric standard points of the first biometric image after the affine conversion and the closest biometric standard points of the second biometric image is the smallest. With the process, a result of the position alignment illustrated in FIG. 5 is obtained. In the following process, the first biometric image means the first biometric image after the affine conversion.

Next, the association unit 40 respectively associates the biometric standard points of the first biometric image with the closest biometric standard points of the second biometric image (Step S5). In this case, the biometric standard point associated with a biometric standard point is not associated with another biometric standard point. The biometric standard point associated with a biometric standard point is referred to as a stable biometric standard point. The biometric standard point associated with no biometric standard point is referred to as an isolated biometric standard point. In FIG. 4A and FIG. 4B, a pair of a biometric standard point $P_1$ and a biometric standard point $Q_1$, a pair of a biometric standard point $P_3$ and a biometric standard point $Q_2$, and a pair of a biometric standard point $P_4$ and a biometric standard point $Q_4$ are stable biometric standard points. A biometric standard point $P_2$ and a biometric standard point $Q_3$ are isolated biometric standard points.

Next, the association unit 40 determines whether there is an isolated biometric standard point (Step S6). That is, it is determined whether there is a biometric standard point that is not associated with another biometric standard point. When it is determined as "Yes" in Step S6, the association unit 40 generates a pseudo biometric standard point (a pseudo feature point) of the isolated biometric standard point at the same coordinate of the isolated biometric standard point in another biometric image, and associates the isolated biometric standard point with the pseudo biometric standard point (Step S7).

Figure 6A:
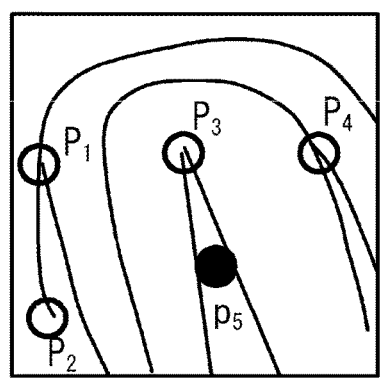
FIG. 6A illustrates a pseudo biometric standard point in a first biometric image.
Figure 6B:
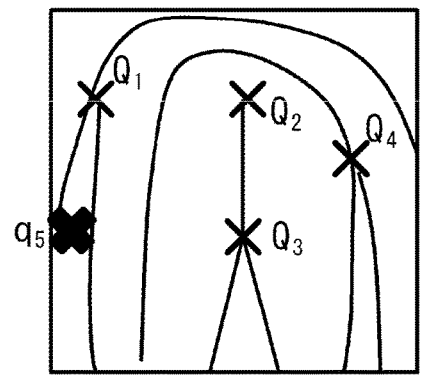
FIG. 6B illustrates a pseudo biometric standard point in a second biometric image.

FIG. 6A illustrates a pseudo biometric standard point in the first biometric image. FIG. 6B illustrates a pseudo biometric standard point in the second biometric image. As illustrated in FIG. 6A, in the first biometric image, a pseudo biometric standard point $p_5$ is generated at the coordinate of the isolated biometric standard point $Q_3$ of the second biometric image. In the second biometric image, a pseudo biometric standard point $q_5$ is generated at the coordinate of the isolated biometric standard point $P_2$ of the first biometric image. And, the isolated biometric standard point $P_2$ is associated with the pseudo biometric standard point $q_5$. The pseudo biometric standard point $q_5$ is associated with the isolated biometric standard point $Q_3$. In the following, a pair of associated biometric standard points and a pair of a biometric standard point and a pseudo biometric standard point are referred to as biometric standard point pairs. With the process, five biometric standard point pairs are associated as illustrated in FIG. 7.

The coordinates of the biometric standard points mean correspondence positions between the standard points of the first biometric image and the standard points of the second biometric image. The correspondence position of the stable biometric standard point may be a coordinate of a biometric standard point of one of the biometric images, or may be a center point of coordinates of biometric standard points of the biometric images. The coordinate of the biometric standard point of the pseudo biometric standard point is the coordinate of the isolated biometric standard point.

When it is determined as "No" in Step S6 or after the execution of Step S7, the feature extractor 60 extracts feature information indicating a shape of a linear-shaped pattern as a biometric feature, in a small region image including the biometric standard point or the pseudo biometric standard point (Step S8). An example of the small region image is such as a circle in which a center is a biometric standard point or a pseudo biometric standard point and a radius is r pixels, or a square of which a side is n pixels. The biometric feature is the number of edge lines extending from the biometric standard point, a local direction of each edge line extending from the biometric standard point, frequency information of the small region image, or the like. The biometric feature is calculated with respect to each small region image. The number of the edge lines extending from the biometric standard point is three when the biometric standard point is a branched point of a 3-way junction. The number of the edge line is one when the biometric standard point is an edge point. The number of the edge line is zero when the biometric standard point is only a point. The frequency information is obtained by applying a discrete Fourier conversion to a small region image and converting a power spectrum into a vector. In this manner, a biometric feature is extracted with respect to each biometric standard point and each pseudo biometric standard point. In the following, a biometric feature at the biometric standard point $P_1$ is expressed as $FP_1$.

Next, the variability calculator 50 calculates a biometric variability with respect to each of the associated biometric standard point pairs (Step S9). The biometric variability is a difference of biometric features of corresponding positions between the first biometric image and the second biometric image. Next, the variability calculator 50 determines whether the biometric variability is large (Step S10). The variability calculator 50 determines that the biometric variability is large, on the basis of the following factors. A largeness or a smallness of the biometric variability is determined with the following factors. When one of the biometric standard point pair is a pseudo biometric standard point, it is determined that the biometric variability is large. When the number of edge lines extending from the biometric standard points is different from each other, it is determined that the biometric variability is large. Alternatively, when an absolute value of a difference of local directions of edge lines extending from the biometric standard point is equal to or more than a threshold, it is determined that the biometric variability is large. Alternatively, when a distance between frequency information and another frequency information is equal to or more than a threshold in a small region image, it is determined that the biometric variability is large. Alternatively, when a distance between the associated biometric standard point and the associated pseudo biometric standard point is equal to or more than a threshold, it is determined that the biometric variability is large. In FIG. 7, one of the pair of $P_2$ and $Q_5$ and one of the pair of $P_5$ and $Q_2$ are a pseudo standard point. Therefore, it is determined that the biometric variability is large. With respect to the pair of $P_3$ and $Q_2$, the number of edge lines extending from biometric standard points is different from each other. Therefore, it is determined that the biometric variability is large. It is determined that the biometric variability is small with respect to the other pairs.

When it is determined as "Yes" in Step S10, the feature extractor 60 stores the both biometric features of the biometric standard point pair (Step S11). When it is determined as "No" in Step S10, the feature extractor 60 discards one of the biometric features of the biometric standard point pair (Step S12). After the execution of Step S11 or after the execution of Step S12, the feature extractor 60 associates the coordinate of the biometric standard point and the biometric feature with the attribute information acquired in Step S1, and stores the coordinate of the biometric standard point and the biometric feature in the storage 70 as enrolled biometric information (Step S13). In FIG. 7, $FQ_1$ and $FQ_4$ are discarded as illustrated in FIG. 8. The other eight biometric features are associated with the coordinate of the biometric standard point, and are stored as enrolled biometric information.

In the embodiment, two biometric images of the same biological body part of the same user are acquires from the biometric sensor 105. When, with respect to the corresponding positions of the same biological body part of the two biometric images, a biometric standard point appears in one of the biometric images and no biometric standard point appears in the other biometric image, a pseudo biometric standard point is generated at the corresponding position of the other biometric image. The biometric feature of a small region including the biometric standard point and the pseudo biometric standard point is stored as a biometric feature of the corresponding position. Alternatively, information indicating the biometric standard point and the pseudo biometric standard point may be stored as the biometric feature of the corresponding position. In this manner, it is possible to achieve a stable authentication even if biometric information with variability in which a biometric standard point appears or does not appear is input from the biometric sensor 105.

When it is determined whether the biometric variability is large, it is possible to determine whether the extracted biometric feature is needed for achieving a stable authentication even if biometric information with variability is input. When one of the biometric features of which a biometric variability is smaller is discarded, it is possible to suppress increasing of a size of the enrolled biometric feature and a calculation cost of the comparison, compared to the case where a plurality of enrolled biometric features are stored. When the biometric variability is small, a difference of biometric features is small. Even if one of the biometric features is discarded, influence on stability of the authentication is small.

[Authentication Process]

Figure 9:
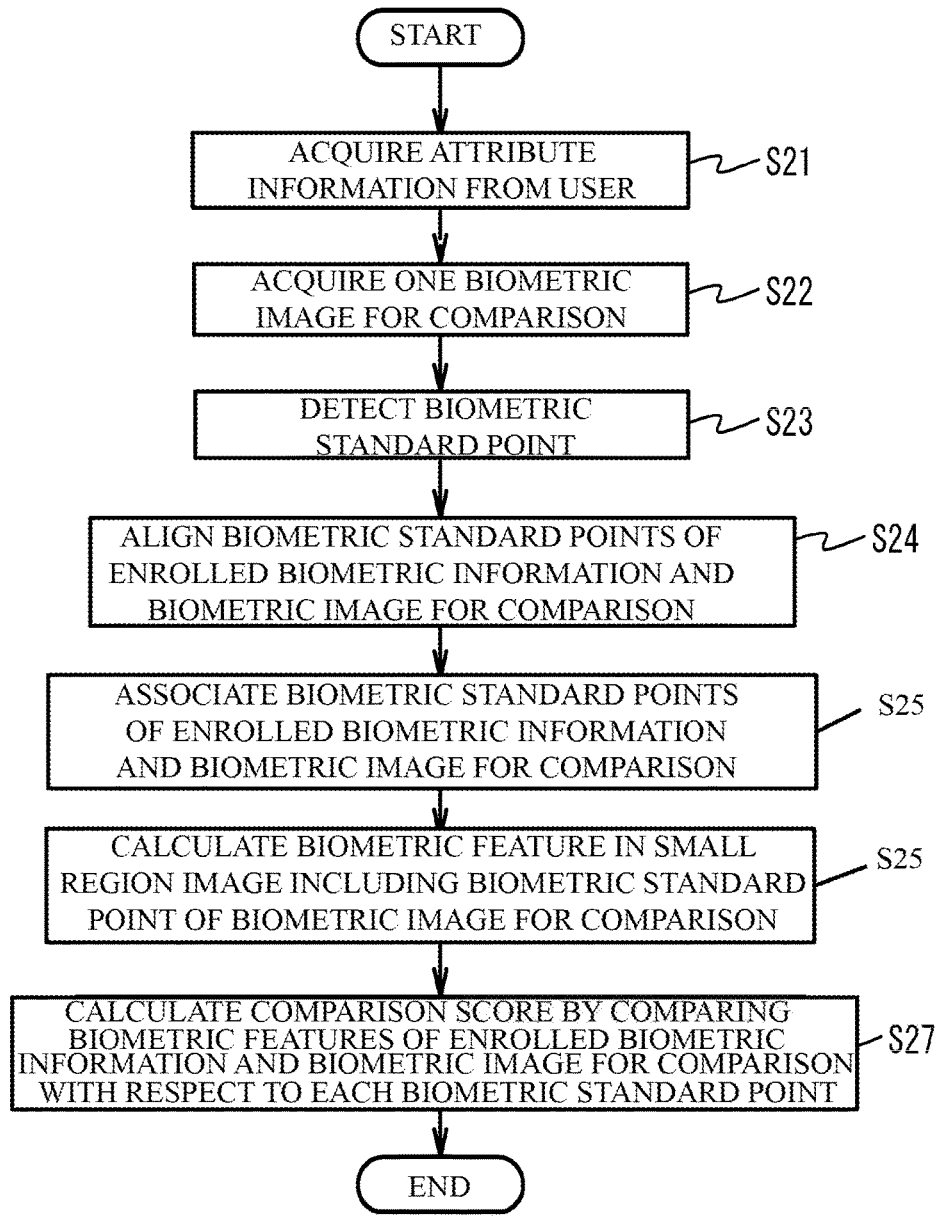
FIG. 9 illustrates a flowchart of details of an authentication process.

FIG. 9 illustrates a flowchart of details of an authentication process executed when a user performs an authentication. As illustrated in FIG. 9, the attribute information acquirer 107 acquires attribute information of a user (Step S21). Next, the image acquirer 10 acquires one biometric image as a biometric image for comparison from the biometric sensor 105 (Step S22). Next, the standard point detector 20 detects biometric standard points from the biometric image for comparison by the same process as Step S3 of FIG. 3 (Step S23). Next, the position aligner 30 aligns coordinates of biometric standard points of enrolled biometric information of which attribute information coincides with the attribute information acquired in Step S21 with coordinates of biometric standard points detected from the biometric image for comparison (Step S24). For example, the position aligner 30 aligns the positions so that distances between the coordinates of the biometric standard points of the enrolled biometric information and the closest coordinates of the biometric standard points detected from the biometric image for comparison become the smallest.

Next, the association unit 40 associates the biometric standard points of the enrolled biometric information with the biometric standard points of the biometric image for comparison by the same process as Step S5 of FIG. 3 (Step S25). Next, the feature extractor 60 extracts feature information indicating a shape of a linear-shaped pattern as a biometric feature in a small region image including the biometric standard points of the biometric image for comparison by the same process as Step S8 of FIG. 3 (Step S26).

Next, the authenticator 80 calculates a comparison score by comparing the enrolled biometric information with the biometric feature of the biometric image for comparison with respect to each biometric standard point (Step S27). FIG. 10 illustrates five pairs of biometric standard points included in the enrolled biometric information, four biometric standard points included in the biometric image for comparison and results of association between the closest pairs. Similarities of the biometric features of the four associated pairs are calculated. When the similarity is large, the similarity between the biometric features is large. For example, when the biometric feature is expressed by a feature vector, the similarity is a reciprocal number of a Euclidean distance of these biometric features. For example, when the number of the biometric feature associated with the enrolled biometric information is 1 as in the case of the first row, a biometric similarity between $FP_1$ and $I_1$ is calculated. For example, the number of the biometric features associated with the enrolled biometric information is 2 as in the case of the second row, a biometric similarity between $FP_2$ and $I_2$ and a biometric similarity between $Fq_5$ and $I_2$ are calculated. Larger one may be used for the process. Both of the similarities or an average of the similarities may be used for the process. For example, a value obtained by dividing a total of the biometric similarities by the number of association of the biometric standard points between the enrolled biometric information and the biometric image for comparison is used as the comparison score.

Next, the authenticator 80 performs identity verification by a threshold process of a comparison score. In concrete, when the comparison score is equal to or more than a threshold, the authenticator 80 determines that an enrolled user is a user to be authenticated. When the comparison score is less than the threshold, the authenticator 80 determines that the enrolled user is different from the user to be authenticated.

In the embodiment, with respect to the corresponding positions of two biometric images acquired from the same biological body part of the same user, biometric features including a feature point and a pseudo feature point are stored as the biometric features of the corresponding positions. When a comparison is performed with the biometric features, it is possible to achieve a stable authentication even if biometric information with variability is input.

In the above-mentioned embodiment, enrolled biometric information is generated from two biometric images. However, enrolled biometric information may be generated from three or more biometric images. For example, when the number of the biometric images is three, enrolled biometric information is generated from two biometric images and new enrolled biometric information is generated from the enrolled biometric information and the third biometric image by the same process. In this case, the three biometric images may not be necessarily acquired in the same sequence. When new enrolled biometric image is generated from the enrolled biometric information generated from two biometric image and the third biometric image acquired by another sequence, it is possible to update enrolled data.

Four biometric images may be divided into a pair of two images. First enrolled biometric information and second enrolled biometric information may be obtained by processing each of the pairs. And a plurality of enrolled biometric information may be obtained. In this case, the authenticator 80 may adopt larger one of the comparison score between the first enrolled biometric information and the biometric feature of the biometric image for comparison and the comparison score between the second enrolled biometric information and the biometric feature of the biometric image for comparison, and may use the larger one for the identity verification.

Figure 11A:
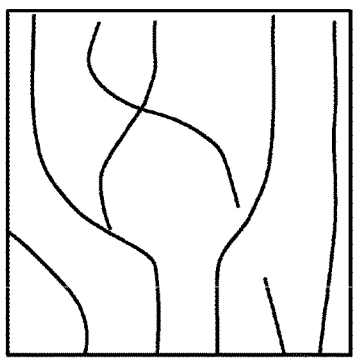
FIG. 11A and FIG. 11B illustrate biometric standard points of a vein pattern.
Figure 11B:
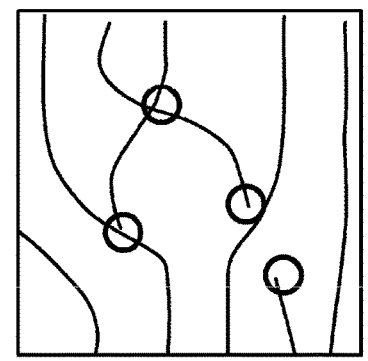
Figure 11C:
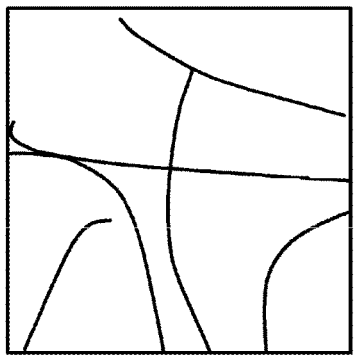
FIG. 11C and FIG. 11D illustrate biometric standard points of a palm print pattern.
Figure 11D:
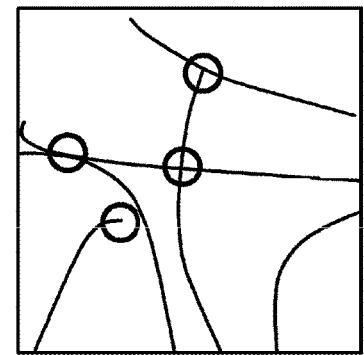

In the above-mentioned embodiment, a fingerprint image is used as a biometric image. However, another biometric image including another linear-shaped pattern may be used. For example, FIG. 11A illustrates a vein pattern of a palm. When a vein pattern is used, a branched point, an edge point, a cross point and so on of the vein pattern may be used as biometric standard points as illustrated in FIG. 11B. FIG. 11C illustrates a palm print pattern. When a palm print pattern is used, a branched point, an edge point and so on of the palm print pattern may be used as biometric standard points as illustrated in FIG. 11D.

Modified Embodiment

Figure 12:
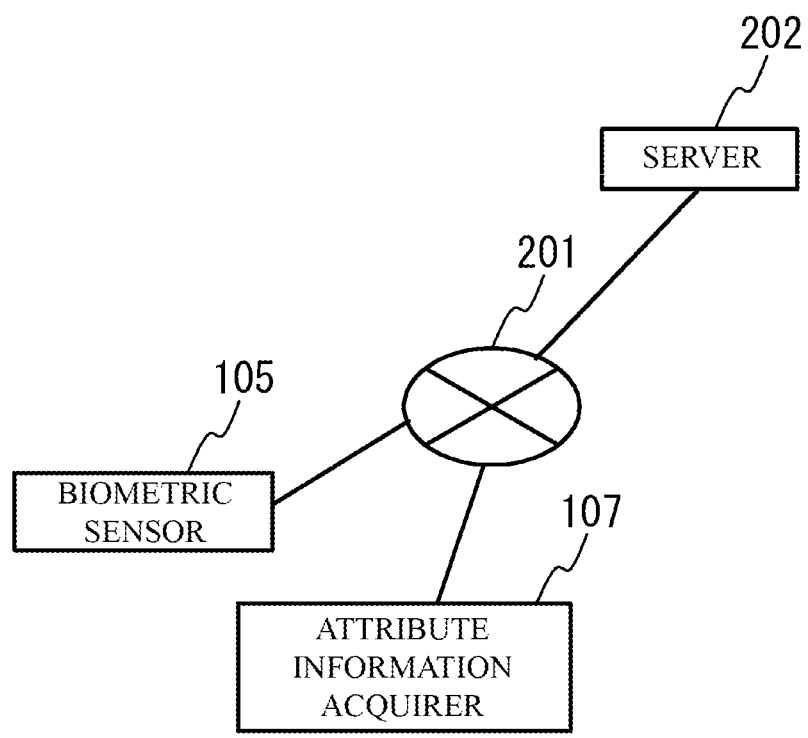
FIG. 12 illustrates an image processing system in accordance with a modified embodiment.

FIG. 12 illustrates an image processing system in accordance with a modified embodiment. In the above-mentioned embodiment, each unit of FIG. 2 acquires a biometric image from the biometric sensor 105, acquires attribute information from the attribute information acquirer 107, and performs the enrollment process and the authentication process. On the other hand, a server 202 having functions of the units of FIG. 2 may acquire a biometric image from the biometric sensor 105 via an electrical communication line 201, and may acquire attribute information from the attribute information acquirer 107 via the electrical communication line 201.

In the mentioned embodiments, the image acquirer 10 acts as an image acquirer configured to acquire a plurality of biometric images of a same biological body part of a same user from a biometric sensor. The association unit 40 acts as a generator configured to, when a feature point appears at a corresponding position of the same biological body part in one or more of the plurality of biometric images and a feature point does not appear at the corresponding position in another of the plurality of biometric images, generate a pseudo feature point at the corresponding position of the another. The storage 70 acts as a storage configured to store information of the feature point and the pseudo feature point of the plurality of biometric images as a biometric feature. The position aligner 30 acts as a position aligner configured to align positions of the plurality of biometric images by applying an affine conversion to at least one of the plurality of biometric images. The feature extractor 60 acts as an extractor configured to extract a first linear-shaped pattern of a first small region as a first biometric feature and extract a second linear-shaped pattern of a second small region as a second biometric feature, the first small region including the feature point and being smaller than the plurality of biometric images, the second small region including the pseudo feature point and being smaller than the plurality of biometric images. The variability calculator 50 acts as a determiner configured to determine whether a difference of biometric features of the first small region and the second small region, with respect to the corresponding positions.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. An image processing device comprising:
   a memory; and
   a processor coupled to the memory and the processor configured to execute a process, the process comprising:
   acquiring a plurality of biometric images of a same biological body part of a same user from a biometric sensor;
   generating, when a feature point appears at a corresponding position of the same biological body part in one or more of the plurality of biometric images and the feature point does not appear at the corresponding position in another of the plurality of biometric images, a pseudo feature point at the corresponding position of the another of the plurality of biometric images; and
   storing information of the feature point of the plurality of biometric images and the pseudo feature point of the another of the plurality of biometric images as a biometric feature.

2. The image processing device as claimed in claim 1, wherein:
   the plurality of biometric images include a linear-shaped pattern of the same biological body part; and
   the feature point includes at least one of a branched point, an edge point and a cross point of the linear-shaped pattern.

3. The image processing device as claimed in claim 1, wherein the process further comprises aligning positions of the plurality of biometric images by applying an affine conversion to at least one of the plurality of biometric images.

4. The image processing device as claimed in claim 1, wherein:
   the plurality of biometric images include a linear-shaped pattern of the same biological body part; and
   the process further comprises extracting a first linear-shaped pattern of a first small region as a first biometric feature and extracting second linear-shaped pattern of a second small region as a second biometric feature, the first small region including the feature point and being smaller than the plurality of biometric images, the second small region including the pseudo feature point and being smaller than the plurality of biometric images.

5. The image processing device as claimed in claim 4, wherein:
   the process further comprises determining whether a difference of biometric features of the first small region and the second small region, with respect to the corresponding positions; and
   in the storing, the biometric feature of which the difference is determined to be large is associated with the corresponding positions, and the biometric feature is stored.

6. The image processing device as claimed in claim 5, wherein, in the determining, it is determined that the difference is large, when any of the corresponding positions of the plurality of biometric images is a pseudo feature point.

7. The image processing device as claimed in claim 5, wherein, in the determining, it is determined that the difference is large, when a number of linear-shaped patterns extending from the corresponding position of the first small region is different from a number of linear-shaped patterns extending from the corresponding position of the second small region.

8. The image processing device as claimed in claim 5, wherein, in the determining, it is determined that the difference is large, when an absolute value of a difference between local directions of the linear-shaped pattern extending from the corresponding position of the first small region and local directions of the linear-shaped pattern extending from the corresponding position of the second small region.

9. The image processing device as claimed in claim 5, wherein, in the determining, it is determined that the difference is large, when a distance between a feature vector of frequency information of the first small region and a feature vector of frequency information of the second small region is equal to or more than a threshold.

10. The image processing device as claimed in claim 1, wherein the process further comprises determining whether the user is a person himself or herself, on a basis of a similarity between a first biometric feature of a small region and a second biometric feature stored in the storage, the small region including a feature point included in a biometric image obtained by the biometric sensor during an authentication of a user and being smaller than the biometric image.

11. An image processing method comprising:
acquiring a plurality of biometric images of a same biological body part of a same user from a biometric sensor;
generating, when a feature point appears at a corresponding position of the same biological body part in one or more of the plurality of biometric images and the feature point does not appear at the corresponding position in another of the plurality of biometric images, a pseudo feature point at the corresponding position of the another of the plurality of biometric images; and
storing information of the feature point of the plurality of biometric images and the pseudo feature point of the another of the plurality of biometric images as a biometric feature.

12. The image processing method as claimed in claim 11, wherein:
the plurality of biometric images include a linear-shaped pattern of the same biological body part; and
the feature point includes at least one of a branched point, an edge point and a cross point of the linear-shaped pattern.

13. The image processing method as claimed in claim 11, further comprising aligning positions of the plurality of biometric images by applying an affine conversion to at least one of the plurality of biometric images.

14. The image processing method as claimed in claim 11, wherein:
the plurality of biometric images include a linear-shaped pattern of the same biological body part; and
the image processing method further comprises extracting a first linear-shaped pattern of a first small region as a first biometric feature and extracting second linear-shaped pattern of a second small region as a second biometric feature, the first small region including the feature point and being smaller than the plurality of biometric images, the second small region including the pseudo feature point and being smaller than the plurality of biometric images.

15. The image processing method as claimed in claim 14, further comprising determining whether a difference of biometric features of the first small region and the second small region, with respect to the corresponding positions,
wherein, in the storing, the biometric feature of which the difference is determined to be large is associated with the corresponding positions, and the biometric feature is stored.

16. The image processing method as claimed in claim 15, wherein, in the determining, it is determined that the difference is large, when any of the corresponding positions of the plurality of biometric images is a pseudo feature point.

17. The image processing method as claimed in claim 15, wherein, in the determining, it is determined that the difference is large, when a number of linear-shaped patterns extending from the corresponding position of the first small region is different from a number of linear-shaped patterns extending from the corresponding position of the second small region.

18. The image processing method as claimed in claim 15, wherein, in the determining, it is determined that the difference is large, when an absolute value of a difference between local directions of the linear-shaped pattern extending from the corresponding position of the first small region and local directions of the linear-shaped pattern extending from the corresponding position of the second small region.

19. The image processing method as claimed in claim 15, wherein, in the determining, it is determined that the difference is large, when a distance between a feature vector of frequency information of the first small region and a feature vector of frequency information of the second small region is equal to or more than a threshold.

20. A computer-readable, non-transitory medium storing a program that causes a computer to execute a process, the process comprising:
acquiring a plurality of biometric images of a same biological body part of a same user from a biometric sensor;
generating, when a feature point appears at a corresponding position of the same biological body part in one or more of the plurality of biometric images and the feature point does not appear at the corresponding position in another of the plurality of biometric images, a pseudo feature point at the corresponding position of the another of the plurality of biometric images; and
storing information of the feature point of the plurality of biometric images and the pseudo feature point of the another of the plurality of biometric images as a biometric feature.

* * * * *